United States Patent
Karsh et al.

(10) Patent No.: US 10,289,923 B2
(45) Date of Patent: *May 14, 2019

(54) IMAGE PRODUCTION FROM VIDEO

(71) Applicant: Google LLC, Mountain View, CA (US)

(72) Inventors: Jason Adam Karsh, San Francisco, CA (US); Jason Robert Richard Sanio, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,547

(22) Filed: Dec. 14, 2017

(65) Prior Publication Data

US 2018/0107888 A1    Apr. 19, 2018

Related U.S. Application Data

(63) Continuation of application No. 14/801,261, filed on Jul. 16, 2015, now Pat. No. 9,846,815.

(51) Int. Cl.
*G06T 7/00* (2017.01)
*H04N 5/232* (2006.01)
(Continued)

(52) U.S. Cl.
CPC .............. *G06K 9/32* (2013.01); *G06F 3/02* (2013.01); *G06K 9/00711* (2013.01); *G06K 9/40* (2013.01);
(Continued)

(58) Field of Classification Search
CPC .............. H04N 5/23267; H04N 5/232; H04N 5/23258; H04N 5/144; G06K 9/32;
(Continued)

(56) References Cited

U.S. PATENT DOCUMENTS 6,504,569 B1    1/2003    Jasinschi
8,401,242 B2    3/2013    Newcombe
(Continued)

FOREIGN PATENT DOCUMENTS

KR    10-2008-0051905    6/2008
WO         02037179    5/2002

OTHER PUBLICATIONS

International Search Report and Written Opinion in PCT Application No. PCTIUS2016/042617, dated Oct. 11, 2016, 13 pages.
(Continued)

*Primary Examiner* — Jon Chang
(74) *Attorney, Agent, or Firm* — Lisa Benado; IP Spring (57) ABSTRACT

Implementations generally relate to producing a still image from a video or series of continuous frames. In some implementations, a method includes receiving the frames that a capture device shot while moving in at least two dimensions. The method further includes analyzing the frames to determine changes of positions of objects in at least two of the frames due to movement of the objects in the scene relative to changes of positions of objects due to the movement of the capture device during the shoot time. The method further includes determining, based at least in part on the variability of the objects, one or more target subjects which the capture device captures during the shoot time. One or more still images are generated from the plurality of frames having at least a portion of the target subject.

20 Claims, 5 Drawing Sheets

(51) Int. Cl.
  *G06K 9/32* (2006.01)
  *G06K 9/00* (2006.01)
  *G06K 9/40* (2006.01)
  *H04N 5/14* (2006.01)
  *G06T 7/20* (2017.01)
  *G08B 13/196* (2006.01)
  *G06F 3/02* (2006.01)
  *G06K 9/20* (2006.01)

(52) U.S. Cl.
  CPC .......... *G06T 7/20* (2013.01); *G08B 13/19602* (2013.01); *G08B 13/19606* (2013.01); *H04N 5/144* (2013.01); *H04N 5/232* (2013.01); *H04N 5/23258* (2013.01); *H04N 5/23267* (2013.01); *G06K 2009/2045* (2013.01)

(58) Field of Classification Search
  CPC .............. G06K 9/40; G06K 9/00711; G06K 2009/2045; G06T 7/20; G06F 3/02; G08B 13/19602; G08B 13/19606
  See application file for complete search history.

(56) References Cited

U.S. PATENT DOCUMENTS

| | | | |
|---|---|---|---|
| 8,466,987 B2 | 6/2013 | Walker et al. | |
| 8,624,998 B2 | 1/2014 | James et al. | |
| 9,846,815 B2* | 12/2017 | Karsh | G08B 13/19606 |
| 2008/0138783 A1* | 6/2008 | Karkanias | G09B 7/02 434/322 |
| 2009/0231453 A1 | 9/2009 | Huang | |
| 2009/0324098 A1 | 12/2009 | Nilsson | |
| 2010/0171846 A1* | 7/2010 | Wood | H04N 1/00323 348/231.99 |
| 2010/0283609 A1* | 11/2010 | Remer | G08B 25/016 340/541 |
| 2011/0199470 A1 | 8/2011 | Moller et al. | |
| 2012/0315016 A1* | 12/2012 | Fung | H04N 5/2252 386/248 |
| 2013/0010109 A1* | 1/2013 | Chen | H04N 5/2251 348/143 |
| 2013/0053007 A1 | 2/2013 | Cosman et al. | |
| 2013/0057713 A1 | 3/2013 | Khawand | |
| 2014/0147000 A1 | 5/2014 | Wu et al. | |
| 2014/0226059 A1* | 8/2014 | Momose | H04N 5/2256 348/370 |
| 2014/0348484 A1 | 11/2014 | Erwin et al. | |

OTHER PUBLICATIONS

"Boinx Software." Boinx Software Lld. Web. Copyright 2015. Accessed Jul. 15, 2015. <<http://boinx.com/seethis/>>.
International Preliminary Report on Patentability in PCT Application No. PCT/US2016/042617, 9 pages, Jan. 25, 2018.
Notice of Preliminary Rejection in Korean Application No. 10-2017-7031439, 9 pages, dated Oct. 19, 2018.
Notice of Allowance in Korean Application No. 10-2017-7031439, 2 pages, dated Mar. 14, 2019.

* cited by examiner

IMAGE PRODUCTION FROM VIDEO

RELATED APPLICATIONS

This application is a continuation of, and claims priority to, U.S. patent application Ser. No. 14/801,261, filed Jul. 16, 2015, the contents of which are incorporated herein by reference in their entirety.

BACKGROUND

Convenience of digital cameras along with widespread use of Internet communications has increased the popularity of user-produced images such as videos and photographs. While traditional point and shoot cameras maintain their value, camera technology can also be integrated into many devices, e.g. smartphones, PDA's, smartwatches, tablets, laptops. Having camera technology at a user's fingertips, provides the potential to capture sights that may have otherwise slipped by uncaptured.

SUMMARY

Implementations generally relate to producing one or more still images from a series of still images, e.g. a video, of a scene. In some implementations, a method may employ a computing device to receive the video captured by a capture device during a shoot time. The shoot time may involve the capture device moving in at least two dimensions while capturing the video. The method further may use the computing device to process a plurality of frames of the video and detect variability of objects in at least two of the frames due to movement of the objects in the scene relative to variability of objects due to the movement of the capture device during the shoot time. One or more target subjects may be determined by the computing device based at least on part on the variability of the objects. The target subject is at least one of the intended focal points of the video and may be a subject in the scene that the capture device points towards and captures during at least a portion of the shoot time. The computing device may further generate one or more still images based on the plurality of frames of the video having at least a portion of the target subject. In some aspects, the video is captured automatically by the capture device upon determination of a threshold initiation movement of the capture device prior to the shooting of the video. The threshold initiation movement may include two or more movement characteristics. In some implementations, detection of the threshold initiation movement may involve a threshold change in environment temperature detected by the capture device. In some implementations, the threshold initiation movement may be based, at least in part, on at least one movement of the capture device to initiate manual capture of at least one video during at least one previous shoot time. Such movement of the capture device may be in three dimensions according to x axis, y axis and z axis directions, as described below with regard to FIGS. 2A, 2B and 2C. In such cases, the target subject may be identified by triangulating the objects with the capture device in the frames.

In some aspects, the method may include analyzing the frames in the video to identify an onset frame that includes the start of blurriness of the target subject. The method may further include overlapping focused frames prior to the onset frame with a blurry frame having a blurry target subject to align the target subject depicted in the focused frame with the blurry frame. In some aspects, the method may include rotating orientation of a select one of the one or more still images and filling in content of the select one still image with content from the frames of the video.

In still other implementations, a tangible, non-transient recordable, computer-readable storage device, such as medium, is discussed to store instructions that, when executed by one or more processors of a capture device, cause performance of operations. The non-transitory computer-readable medium may store instructions that cause automatic capture of a video by a capture device during a shoot time. The instruction may cause the receipt of one or more movement characteristics of the capture device. For example, one or more sensors of the capture device may detect and provide movement characteristics. The instructions may also cause the determining a threshold initiation movement of a capture device based, at least in part, on the one or more movement characteristics that indicate intention to acquire an image by the capture device and upon determining the threshold initiation movement, activating automatic capture of a video during a shoot time with the capture device. In some implementations, the instructions may cause detection of movement of the capture device in at least two dimensions during at least a portion of the shoot time. The instructions may cause determining variability of objects in at least two frames of a plurality of frames of the video due to movement of the objects in the scene relative to variability of objects due to the detected movement of the capture device during at least a portion of the shoot time. In addition, the instructions may cause determining one or more target subjects based at least in part on the variability of the objects and the movement of the capture device. From the plurality of frames of the video having at least a portion of the one or more target subjects, the instructions may cause generating one or more still images.

In some implementations, the one or more movement characteristics may include a threshold change in environment temperature detected by the capture device. In still some implementations, the one or more movement characteristics include a threshold change in one or more of ambient light, pressure, and infrared light. The threshold initiation movement may be based, at least in part, on at least a combination of two or more movement characteristics of the capture.

At times, the capture device may move in three dimensions according to x axis, y axis and z axis directions, and frame processing to identify a target subject may further be to triangulate the objects with the capture device in the frames.

In some implementations, the frame processing by the second computing device may be further to determine an onset frame in which blurriness of the target subject is first detectable; determine a focused frame prior to the onset frame; overlap the focused frames with a blurry frame having a blurry target subject; and align the target subject of the focused frame with the target subject of the blurry frame. In some implementations, frame processing may be further to rotate the orientation of a select one of the one or more still images and to fill in content of the select one still image with content from the frames of the video.

In yet some implementations, an image capture system is provided and may include one or more processors and a memory coupled to the processors. The memory may be configured to store instructions, such as an application, that cause the one or more processors to receive a video of a scene captured by a capture device during a shoot time that includes movement of the capture device in at least two dimensions. The system may further determine variability of objects in at least two frames of a plurality of frames from the video relative to the movement of the capture device during the shoot time. The system may determine, based at least on part on the variability of the objects and the movement of the capture device, one or more target subjects which the capture device pointed towards during at least a portion of the shoot time and identify for storage one or more still images from the plurality of frames of the video having at least a portion of the one or more target subjects.

In some implementations, the video may be automatically captured by the capture device upon determination of a threshold initiation movement of the capture device prior to capture of the video. The threshold initiation movement may be based on detection of one or more movement characteristics. The movement characteristics may include two or more of environment temperature, acceleration, orientation, altitude, tilt, and rotational movement of the capture device detected by two or more sensors. The detection of the threshold initiation movement may include a threshold change in environment temperature detected by the capture device. The threshold initiation movement may be based, at least in part, on at least one movement of the capture device to initiate manual capture of at least one video during at least one previous shoot time. In some implementations, movement of the capture device may be in three dimensions according to x axis, y axis and z axis directions, and identifying a target subject may further include triangulating the objects with the capture device in the frames.

In some implementations, the instructions may further the one or more processors to determine an onset frame in which blurriness of the target subject is first detectable, determine a focused frame prior to the onset frame, overlap the focused frames with a blurry frame having a blurry target subject, and align the target subject of the focused frame with target subject of the blurry frame. In some implementations, the instructions may further cause the one or more processors to rotate orientation of a select one of the one or more still images and fill in content of the select one still image with content from the frames of the video.

In some implementations an apparatus may be provided and include means for receiving a video of a scene captured by a capture device during a shoot time that includes movement of the capture device in at least two dimensions. Such means for receiving may include, for example, an interface of the apparatus. The apparatus may further include a means for analyzing frames of the video to determine variability of objects in at least two of the frames due to movement of the objects in the scene relative to variability of objects due to the movement of the capture device during the shoot time. The apparatus may include a means for determining, based at least on part on the variability of the objects, one or more target subjects which the capture device points towards and captures during at least a portion of the shoot time. Such means for determining one or more target subjects may include, for example, a selection component of the apparatus. The apparatus may also include a mean for identifying for storage one or more still images from the plurality of frames of the video having at least a portion of the target subject, such as by the selection component and/or a creation component of the apparatus.

BRIEF DESCRIPTION OF THE DRAWINGS

FIGS. 3a and 3b are flow diagrams of example processes in which FIG. 3a shows a pre-capture phase and FIG. 3b shows post-capture frame processing and producing a still image;

DETAILED DESCRIPTION

In various implementations, an image capture system provides a tool to generate a still image from a series of successive image frames, such as a video, captured with a capture device. The image capture system may provide for methods to enable pre-capture, capture and post-capture of images. In some implementations, during a pre-capture phase, a capture device may be triggered to automatically capture images and/or automatically fix or change capture device settings for capturing images. During a capture phase, a series of successive frames, e.g. video or burst of images, may be captured. In some implementations, the capture device is waved in various directions during at least a portion of the capture phase during a shoot time. During a post-capture phase, the image capture system may select and process one or more of the captured frames to produce a still image. The frames may include a variety of views of a scene taken from different capture device orientations that are used to produce one or more still images of the scene.

In some implementations, some or all of the processes to capture image frames, select frames and process frames to produce a still image may be performed on the same device, such as a capture device. In still some implementations, the pre-capture processes and capturing of frames may be performed on one device, e.g. a capture device and the post-capture processes of selecting, editing and producing a still image may be performed on another device, e.g. computing device, such as a client/server or cloud type architecture. The device for the various processes to generate still images described herein may be a mobile device, desktop computer, etc.

The capture device may shoot a video at various rates, e.g. 24 frames per second (fps) to 30 fps or at higher rates, such as 60 fps, 120 fps and 240 fps, and even higher rates still. In some implementations, the device may a shoot series of frames in a continuous capture mode (burst mode) at various rates, e.g. 2 fps to 5 fps or 10 fps, such as 3 fps. The rate may remain constant during a shoot or may change, for example, start at a rapid rate, e.g. 3-10 fps, followed by slower rates. A variety of number of frames may be captured in a single burst in a single image file, e.g. 10 to 15 frames or more than 15 frames, e.g. 20 to 40 frames.

The image capture system provides for efficient sifting of large volumes of frames to create a smaller number of still images that may be used in various ways, e.g. stored, shared, viewed, etc. For example, over hundreds or thousands of video frames may be captured and analyzed to produce a single or a few still images. The still image may be a segment of the video that has been created or copied and stored in electronic form, such as a photograph, from one or more frames or portions of frames of the video.

Implementations of the image capture system may assist a user who attempts to capture a still image from a scene. A user may be interested in taking a picture, but the time to get a capture device (e.g. camera, smartphone camera, etc.) ready may risk losing the shot. Preparing the device to shoot a picture can consume too much time. For example, preparing a capture device may include switching the capture device on (e.g. powering on, waking from sleep, unlocking, or otherwise activating the capture device) or stopping another operation of the capture device, initiating a camera application (e.g. loading a software application on a smartphone, tablet or wearable device; entering a camera mode on a standalone camera etc.), waiting for the camera application to load (e.g. in random-access memory of a smartphone), focusing the camera on a subject (e.g. through manual focus, autofocus etc.) and activating a capture button. Other operations may also be involved in preparing a capture device in other contexts and for other devices, such as adjusting resolution, frame rate, color mode, etc. A consequence of the time required to prepare the capture device may be lost opportunities to take a photograph or otherwise capture the moment.

In one illustrative example, a skier may encounter a mountain lion running and the skier may attempt to quickly capture a shot of the animal. The skier may have a very short duration of time available (e.g. a second or less) to wrestle a capture device out of his or her pocket and take the picture of the mountain lion. To add to the complications, the skier may be skiing down a slope while also trying to take a photograph. It would be advantageous if the skier could swiftly and easily capture the moment with the mountain lion.

Camera technology that requires a stable and focused platform may create challenges for the skier to successfully shoot a clear and complete image of the animal. In some implementations, the image capture system provides a rapid response tool that enables the skier to obtain a quality still image by simply pulling out a capture device and automatically shooting the scene, e.g. while the capture device remains locked. The skier may avoid the need to activate the camera technology and focus the capture device.

In some examples, the capture device may be scanned in various directions and angles to obtain a video of the scene. Thus, the capture device may be held in a horizontal position, vertical position, or any angled orientation while capturing the video. The capture device may also be moved in random or free form directions in two dimensions or three dimensions during the shooting to essentially paint the scene to be captured. For example, the skier may pan the capture device from side to side when the mountain line crosses his or her path.

In some implementations, a capture device may be held relatively constant but the person holding the camera may move or rotate. For example the skier performing a jump, or a dancer wearing the camera may perform a dance move while capturing other surrounding dancers. Thus, capture device movement infers there is relative motion between the capture device and the scene. In some implementations, such relative movement may be recognized and in some cases compensated for when producing the image.

In the case of the skier, the capture device may capture a video of the mountain lion scene while moving in the general direction of the running mountain lion, at the same time as the skier travels downhill over rough terrain. The image capture systems can take this seemingly difficult video to capture with both the subject and the capture device moving, and produce one or more sufficient still images of the mountain lion.

In the foregoing example, the capture device may detect the skier's intention to capture the scene with the mountain lion and in response, commence recording a video. For example, the capture device may include a temperature sensor that detects a drop in external temperature as the capture device is removed from a pocket or pouch. An ambient light meter may also detect an increase in external brightness. An accelerometer, gyroscope and/or compass may detect movement and orientation changes of the capture device as it is moved into position.

In some implementations, the capturing of the video may be activated on a capture device that is locked and in a screen saver mode. The capture device need not be unlocked to automatically capture the video. In some examples, the capturing may be activated automatically. In some examples, the capturing may be activated based on user actions e.g. a gesture, a voice command, etc.

The automatic activation of the capture device may enable image capture when something interesting happens or while the user performs other activities, e.g. while skiing, detect a jump, slide or another interesting event; while hunting or hiking, detect the appearance of an animal and automatically capture video; while playing or watching sports, automatically capture images etc. In addition, automatic capture may be used when the user is holding the camera in a mount (e.g. waist pouch, head mount, worn around the neck etc.). For example, a neck mounted capture device may auto detect the presence of a person and automatically trigger capture of a video of the person.

During a post-capture phase, the video or other file of continuous frames from the capture device may be processed to determine one or more frames that meet certain selection criteria. The selection criteria may include depiction of a target subject. The image capture system may determine the intended target subject of the video or file, for example, by analyzing various frames. During at least a portion of the shoot time in which the video or continuous frames are captured, the capture device, such as the capture device lens, aperture or other capture component, may be pointed or directed towards the target subject to capture the target subject.

In the example of the skier, some of the video frames may include at least portions of the mountain lion, along with an abundance of surrounding objects, e.g. snow, sky and trees. The image capture system may analyze the objects in the various frames, and determine that a particular object depicted in the frames, e.g. mountain lion, is moving. Since the capture device may follow the object, the moving object may be a common element in many of the frames. The image capture system may compare the moving object with other objects in the background and foreground that do not appear to be followed by the capture device.

In the case of the skier, the image capture system may choose the mountain lion as the target subject of the video, rather than various other objects that are determined to be stationary in the scene, e.g. trees, snow and sky. Even though more surrounding objects may be captured, it may be determined that the surroundings vary in type from frame to frame, e.g. the video captures a number of different trees, snowy areas and portions of the sky. It may be determined however, that the video captures just one mountain lion. Accordingly, the image capture system may deduce that the object being followed is the target subject and not the changing surrounding objects.

In some implementations, the target subject may be determined by user input. For example, a user may view the captured frames on the capture device and select a target subject by touching the target subject object depicted in at least one of the frames, choose from a selection of possible target subjects presented to the user, textually describe the target subject and the image capture system may use natural language processing and image recognition to identify the target subject in the frames, use voice input, or other input modalities to identify the target subject.

The image capture system may select one or more frames of a video or series of continuous frames that include the target subject. In some implementations a new still image may be created that did not exist in any one of the captured frames. In some implementations, content from various frames of the video or series may be utilized in the creation of a still image. For example, one frame may be selected to edit and content may be referenced or merged from other frames to obtain a better focused image of the subject, to reduce motion effects of the subject, to improve color features of the subject, to improve dynamic range, such as a subject moving from shadow area to a lit area, etc.

At times, one or more frames having the target subject may be further processed to improve quality of a still image from the video or series of continuous frames. For example, a defect, e.g. blurriness, in a frame of interest may be corrected by accessing content in other frames in the video. In some implementations, multiple frames or portions of frames may be stitched together to complete an object, such as a target subject. Further, data missing as a result of the stitching of mismatched borders may be filled in with content from other frames. Some examples of editing are described below with regard to FIG. 1.

Figure 1:
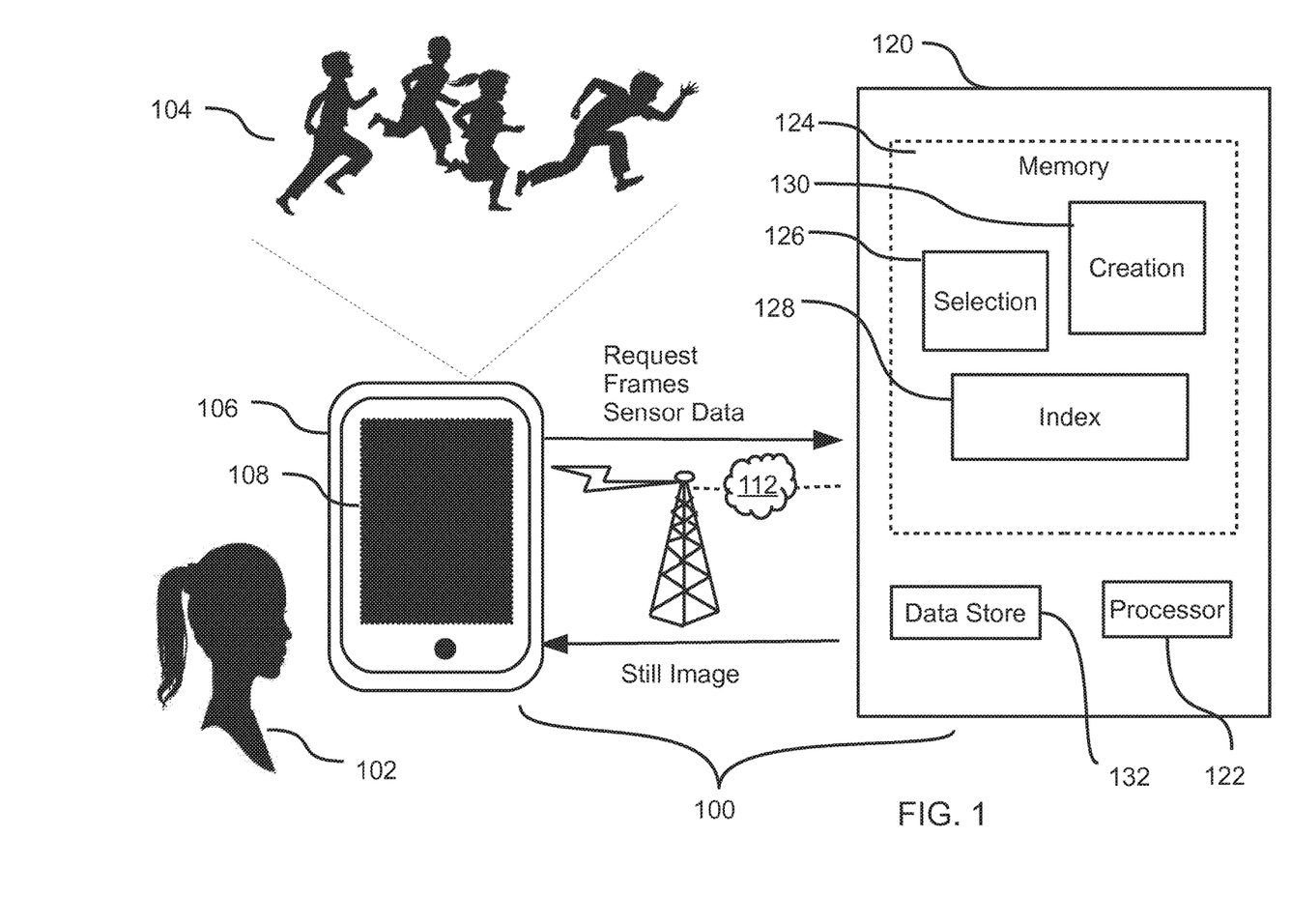
FIG. 1 is a conceptual diagram illustrating an example environment in which various aspects of producing a still image from a video can be implemented in an image capture system.

FIG. 1 illustrates an example environment in which to implement some embodiments of an image capture system 100. In some implementations, the image capture system 100 may include a capture device 106 to capture video or series of continuous frames of a scene 104 by a user 102. The system 100 may further include a computing device 120 to process the video and generate a still image of the scene 104. In some implementations, the computing device 120 may be integrated within the capture device 106. In still some implementations, the capture device 106 and computing device 120 may communicate with each other across a network 112 to implement the production of a still image of the scene 104. The image capture system 100 makes it easy for a user 102 to capture a quality still image, even under typically unfavorable conditions, such as the scene 104 of children playing, as shown in FIG. 1.

In the example shown in FIG. 1, a user 102 may deliberately move the capture device 106 from a resting position to an orientation toward the scene and such movement may be interpreted as user intent to capture a scene 104. In some implementations, certain movement characteristics of the capture device may be detected with the use of one or more sensors associated with the capture device 106. The sensors may be internally located within the capture device, fixed to the surface of the capture device, removably attached to the capture device, etc. The sensor data representing the movement characteristics may be provided to a movement module to interpret the sensor data. The movement module may recognize one or more movement characteristics as meeting a threshold initiation movement that indicates a user's intention to capture one or more images. In addition, there may be other modalities that may be recognized as a user intent to capture an image and activate automatic capturing of images and/or fix or change capture device settings. Some additional modalities may include a user's gestures, voice commands, detection of particular subjects, events occurring, location of the capture device, etc.

The capture device 106 may be moved from a resting place to a ready position to capture a scene. In various implementations, the capture device 106 may automatically commence capture of the video or series of continuous frames as a result of the capture device 106 detecting a threshold initiation movement of the capture device 106 that indicates a user's intention to capture video. The initiation movement may include various movement characteristics that represent a change of the capture device 106 from a resting position to a capture ready position in which the capture device is ready to shoot a scene. In some implementations, various capture settings, such as exposure, focus, high dynamic range, filters, etc., may also be automatically fix or changed based on detected movement characteristics, e.g. capture device orientation. The resting position may be any position of the capture device 106 that suggests the device is not positioned to capture an image. For example, the capture device 106 may be lying in a pocket, pouch, bag, sleeve, etc. In some implementations, the capture device 106 may be performing other non-capture functions while in a resting position. For example, the capture device 106 may be held by a user to make a telephone call, text, email, play games, surf the Internet, etc. In some examples, a capture ready position may include holding the capture device 106 to face a scene such that a camera lens is directed toward or in the general direction of a target subject. In some examples, a capture ready position may include an approximately vertical (or horizontal) position of the device, with the camera aperture or lens not occluded (e.g. unlike when the device is lying in a user's pocket). In some examples, a capture ready position may be determined based on motion of the capture device as sensed by one or more sensors (e.g. lifting the device a certain amount, rotating the device etc.).

Movement characteristics may include detection of the physical changes or movement of the capture device 106. For example, in some implementations, a movement characteristic may include acceleration of the device. For example, a movement of a capture device 106 to a capture ready position may be at a faster rate than movement of the capture device to perform a different function, such as sending a text. The acceleration rate may also be slower than other actions, such as the speed in which a capture device falls toward the ground. A threshold or range of acceleration rate may be one indication of an intention to capture an image.

Another example of a movement characteristic may include a change in orientation of the capture device 106 in which a camera lens of the capture device 106 faces away from the user. Thus, a threshold movement characteristic may be a delta in orientation from one orientation, such as a horizontal or lying flat orientation, e.g. 180 degrees representing a capture device facing directly down or 360 degrees representing a capture device facing directly up, to rotate to an upward position in which the camera lens is facing out, e.g. 90 degrees rotation. Some capture device orientations, like a horizontal landscape position, may represent an increased likelihood that a user intends to capture a video. In addition, a particular tilt of the capture device may constitute a movement characteristic.

In another example, a threshold height or change in height may be another movement characteristic that may indicate an intention to capture an image. In some examples, altitude may be detected by an altimeter or barometer of the capture device. In some implementations, a user's physical characteristics, such as tallness of the user, may be used to determine capture device height as a movement characteristic. For example, the height in which a capture device is held by a child to shoot an image may be shorter than the height in which an adult may hold the capture device. In some implementations, height may vary based on the environmental context of the capture device. For example, if it is determined that the capture device is in a moving vehicle, e.g. as determined by a GPS or an accelerometer, the capture device height may be decreased to an appropriate stature for a user who is sitting compared to a capture device height of a standing user.

Other movement characteristics involving detection of physical movement may include location of the capture device 106. For example, the capture device 106 may be determined to be located, e.g. by a GPS on the capture device 106 or located elsewhere, at or near a location that is popular for image capture, such as a landmark. In some implementations, the popularity of the location may be based on preferences of the user. For example, the image capture system may detect, store and access previous behaviors of the user in an index or may access a database e.g. a database stored in a remote location. In some implementations, locations in which the user had, on previous shoot times, manually taken images with a capture device 106 may be accessed.

The image capture system may also access user's prior web posts, emails or other communications to determine locations that are of special interest to the user and/or events scheduled in a calendar for the user. For example, the user may post that she will be attending her child's play at a school theater at a particular date and time. The location of the theater, e.g. GPS coordinates, and event time may be stored in an index as movement characteristics. When the capture device 106 is determined to be at the location, e.g. checked in at an event or determined by matched GPS coordinates, and the event time occurs, the capture device 106 may be automatically activated to capture images.

In some implementations, the location of the capture device may be compared with other capture devices in the location to indicate intention to capture images at that location. For example, if a certain number of other capture devices at the location are capturing images and uploading captured images to a social media site, the location may be a movement characteristic to trigger automatic capture, either alone or in combination with other detected movement characteristics. In some implementations, a movement characteristic, such as location may cause an alert for the capture device to monitor other movement characteristics, such as capture device acceleration and orientation, and activate automatic capture upon a threshold initiation movement.

Movement characteristics may also include a variety of condition changes detected from the capture device 106. For example, a movement characteristic that represents a condition change may include changes in external environment temperature to which the capture device 106 is exposed. Internal temperature changes may also be detected as movement characteristics. Such temperature changes may occur, for example, as a capture device 106 is removed from a pocket, bag or compartment. The temperature may become cooler as the capture device travels to or is exposed to an open environment for shooting a video.

Other movement characteristics that represent a condition change may include changes in exposure of the capture device to external light in the capture device's environment. For example, in some instances, a capture device 106 may be kept in a dark environment, such as a case, pocket, bag, etc. when at rest and moved to an environment with more light. Change in light may be detected by increased lumens when preparing to capture an image.

Movement characteristics detected by sensors may further include infrared light. For example, body heat or motion may be detected by the infrared sensor and changes in infrared light may indicate intention to capture an image. In some implementations, the movement characteristic may include changes in heat from an object compared to background heat. In still some implementations, pressure may be sensed as a movement characteristic. Other movement characteristics may be detected and used in determining a threshold initiation movement.

In some implementations, a threshold initiation movement may be met with a number of movement characteristics detected, e.g. two or more, three or more, etc. In some implementations, the threshold initiation movement may be reached by particular combinations of movement characteristics, such as acceleration, height and orientation. Certain combinations of movement characteristics may change the threshold to determine an initiation movement. For example, detection of the capture device 106 at a particular location may result in requiring one additional movement characteristic for automatic triggering of the capture device. Detection of the capture device at other locations, by comparison, may require two or more movement characteristics for a threshold initiation movement to be reached.

In some implementations, detected movement characteristics may be assigned values that represent the likelihood of an intention to capture an image. A threshold initiation movement may be reached by one or more movement characteristic values that may be evaluated in combination to reach a particular value threshold. For example, capture device movement to a substantially horizontal landscape orientation may have a value of 3, a rate of acceleration within a particular range may have a value of 5 and change in height within a particular range may have a value of 2. The total value of 10 may be sufficient to reach a threshold initiation movement and trigger automatic capture of a video with the capture device.

In some implementations, the movement characteristics and/or thresholds for initiation movements may be preset and based on usability evidence of actions or capture device data that are determined as indicative of a user's intention to capture an image. Such usability evidence may include behaviors of study groups of users found to typify initiation movements of users who take photographs and videos.

In some implementations, the image capture system may apply a variety of learning techniques such as neural network processes, with actions of a particular user of a capture device 106. For example, reference movement characteristics may be detected and stored in an index as images are manually captured. The reference movement characteristics may be used to change various parameters indicating intention to capture an image, such as to adjust, e.g. increase or decrease, threshold values, to add new movement characteristics, to alter combinations of movement characteristics, to vary threshold initiation movements, etc. In this manner, the automatic capture of an image may adapt to a user's idiosyncrasies.

In some implementations, the image capture system 100 may enable users of the capture device to specify and/or consent to the use of certain information, which may include image capture system 100 using and storing behaviors associated with capturing images and use of capture devices, identity information in recognizing people identified in images, etc. For example, image capture system 100 may provide users with multiple selections directed to specifying and/or consenting to the use of particular information. For example, selections with regard to specifying and/or consenting may be associated with particular capture devices, applications and components of a capture device, individual images, all images, individual photo albums, all photo albums, etc. The selections may be implemented in a variety of ways. For example, the image capture system 100 may cause buttons or check boxes to be displayed next to various selections, such as on a display 108. In some implementations, system 100 enables users of a social network to specify and/or consent to the use of using their images for facial recognition in general.

In situations in which the systems discussed here collect certain information about users, or may make use of certain information, the users may be provided with an opportunity to control whether programs or features collect user information in learning techniques to adapt the image capture system to a user (e.g., information about a user's social network, prior images selected by a user, social actions or activities, profession, a user's preferences, or a user's current location), or to control how to select and/or process captured images that may be relevant to the user.

In addition, certain data may be treated in one or more ways before it is stored or used, so that certain information is removed. For example, a user's identity may be treated so that no information can be determined for the user, or a user's geographic location may be generalized where location information is obtained (such as to a city, ZIP code, or state level), so that a particular location of a user cannot be determined. Thus, the user may have control over how information is collected about the user and used by the image capture system.

A variety of sensors on the capture device 106 may detect changes in conditions that may be characteristic of an initiation movement of the capture device 106. One or more sensors may feed data into a movement module in the capture device 106 to determine whether changes in data meet a threshold amount to indicate an initiation movement of the capture device 106. Examples of such sensors may include a camera, a gyroscope, an accelerometer, a barometer, a compass, a temperature sensor, a proximity sensor, an ambient light sensor, a microphone, a global positioning sensor, a radio transceiver, a capacitive touch sensor, a resistive touch sensor, a fingerprint sensor, a biometric sensor, infrared imaging sensor, pressure sensors, magnetic field sensors, humidity sensors, clocks, etc.

A plurality of sensors that may detect movement characteristics including one or more: accelerometer to determine linear acceleration and detect g-force associated with movement; gyroscope to detect angular rotational velocity, lateral orientation, tilt, roll, pitch and yaw; magnetometer or compass to determine the orientation of the capture device 106 in relation to Earth's magnetic field (e.g. which way is North) and measure strength of magnetic field in Tesla (units of magnetism); barometer to measure altitude of the capture device's position; proximity sensor to detect if the capture device 106 is positioned close to the user, e.g. the user's ear indicating using a phone function rather than taking a photograph or video; GPS to determine location by connecting with multiple satellites. In some implementations, a temperature sensor may detect changes in temperature external to the capture device. In some implementations, the capture device 106 may include a light sensor, such as an ambient light meter at various positions on the capture device 106, including next to the display screen and with various angular profiles. Other sensors are possible.

In some implementations, the sensors may be used to detect movement characteristics that may indicate an intention to stop capture of images, or a threshold ceasing movement. As described above for threshold initiation movements, various sensor data representing movement characteristics may be detected, such as capture device acceleration, orientation, rotational movement, altitude, location, external light, external temperature, etc. When a threshold ceasing movement is determined, the capture device may automatically end capture of video and transition to a post-capture phase.

In FIG. 1, a smartphone type capture device 106 is shown. Any other types of suitable capture devices are applicable for use with the current system, e.g. personal digital assistant, tablet, mobile internet device, digital still camera, digital video camera, personal navigation device, wrist watch, head mounted display and other wearable devices, other mobile devices, etc. The capture device 106 in accordance with various embodiments may be any computing device capable of capturing video or series of continuous frames, e.g. a burst mode.

In some implementations, the image capture system may be operated as a mobile application on a mobile computing device (e.g. smartphone). Other implementations include the image capture system running as a browser application or a standalone application with any type of computing device. One example may be a client/server architecture where video or continuous series of frames may be provided from a client capture device to a computing device server and a resulting still image may be provided from the server to a client device. In another example, all data storage and computations may be performed on one device, such as the capture device 106.

The display screen 108 on the capture device 106 may be used, in some implementations, to display the view being captured by the camera technology, a notification of the status of the capture device 106, e.g. recording in process, or display a user interface to request processing of the captured frames. In some implementations, the display may not be functional during automatic video capture and may not show the video currently being captured. In these cases, the display may remain dark or may show other functions of the capture device 106 that may exclude a camera view.

The display screen 108 may be a TFT (thin-film transistor), liquid crystal display, an OLED (organic light emitting diode) display, head mounted display, or other suitable display technology. In some implementations, the display screen 108 is a multi-touch sensitive screen. A user may use commands such as zoom in, tap, scrolling, swiping, etc., for rapid viewing captured video and/or still images. In some implementations, a capture device 106 may accept various other inputs, such as voice commands and keyboard strokes. It may be appreciated that capture devices 106 with other types of display screens 108, or without a display screen 108 may also be utilized to exploit the video capture component of the image capture system 100.

Figure 2A:
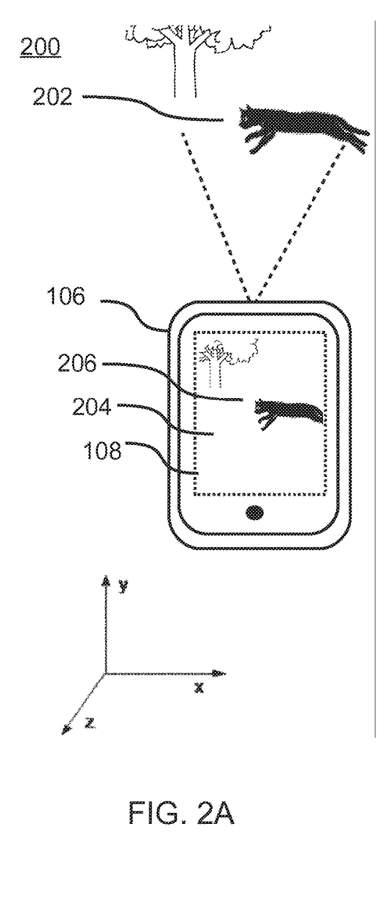
FIGS. 2A, 2B and 2C are conceptual diagrams illustrating an example of a capture device shooting a video during a capture phase.
Figure 2B:
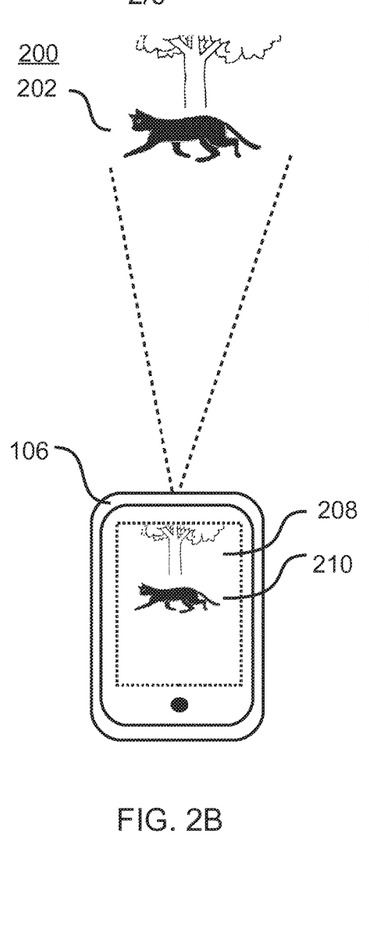
Figure 2C:
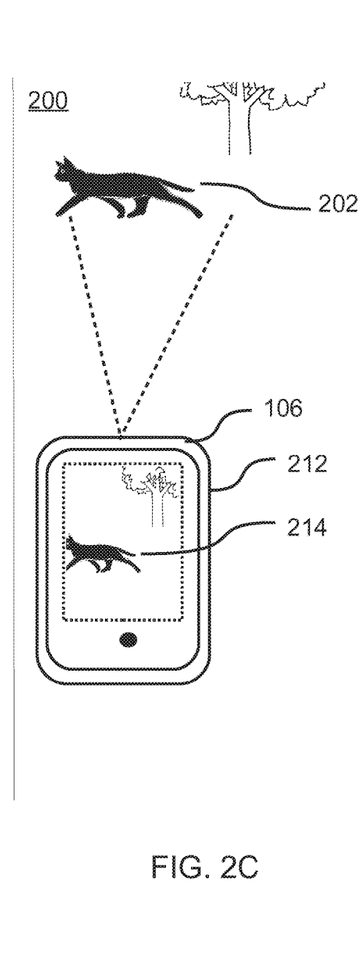

During a capture phase, the capture device 106 may capture a video or a series of continuous frames of a scene in the course of a shoot time. In some implementations, the capture device 106 may be moved in various directions during capture, as shown in the example in FIGS. 2A-C. FIG. 2A shows a first frame 204 of a video of scene 200. FIG. 2B shows a frame 208 of scene 200, captured subsequent to frame 204. FIG. 2C shows a frame 212 at some point after frame 208 shown in FIG. 2B of scene 200.

During the shoot time, the capture device 106 may be moved in various directions e.g. along an x axis, y axis, and/or z axis, and any combination of directions. The path of the capture device 106 during capture may be free form without a predefined course.

In some implementations, the movement of the capture device during a shoot time may also include changing the orientation of the capture device, e.g. landscape (horizontal orientation), portrait (vertical orientation) and any angled in between, e.g. 45 degrees between landscape and portrait. For example, the path of the capture device during the shooting may be an angled sweep while rotating the orientation of the capture device to create a substantially full arch, partial arch or partial circular or circular shaped path. The resulting captured frames may be a collection of a landscape view (zero degrees) followed by angled views to portrait views (about 90 degrees) forming a partial arch shaped depiction of the scene. Continuing with this example, the portrait view (about 90 degrees) of the partial arch shape may be further followed by angled views to a landscape view (about 180 degrees) forming a full arch shaped depiction. Further continuing with the example, the landscape view (about 180 degrees) of the arch shape may be followed by a portrait view (about 270 degrees) to form a partial circular shaped depiction or continued to a landscape view (about 360 degrees) to form a full circular shaped depiction of the scene.

In some implementations, the movement of the capture device during a shoot time may include changing the position of the capture device e.g. along one or more axes x, y or z. F During capture, the capture device 106 may be pointed in the general direction of the target subject 202, which in this instance is a cat. For example, during the shoot time the capture device may be moved along an x axes in a substantially horizontal direction in relation to the target subject 202. The capture device may also be moved along a y axes in a substantially vertical direction in relation to the target subject 202. Furthermore, the capture device may be moved toward or away from the target subject 202 along a z axes. In some implementations, the capture device 106 need not be focused on the target subject. At times, as shown in FIGS. 2A and 2C, only a portion of a target subject 202 may be captured in an object 206, 214 represented in frames 204, 212. As shown in FIG. 2B, a frame 208 may depict the entire target subject object 210.

In some implementations, the target subject object may be determined by comparing the movement of the target subject in relation to the stationary background tree and further in consideration the movement of the capture device during the shoot time. Movement of the capture device may be assessed in x, y and/or z directions, such as by triangulation of the capture device with the scene.

In some implementations, the frame 208 that depicts the entire target subject object 210 may be selected as having a threshold quality to produce a still image. However, frames 204 and 212 may also be chosen, for example, if these frames are determined to include a substantial portion of the target subject object 206, 214. The frames may be edited to add the missing portions of the target subject 202 from other frames in the series of frames capturing the scene. Frames may be also edited to improve quality, such as reduce blur, improve lighting, touch up color, etc., for example, by referencing or adding pixels from other frames in the series of frames to the edited frame.

Referring to FIG. 1, in some implementations, the capture device 106 may transmit across the network 112 to the computing device 120 a request to generate a still image from video or continuous series of frames during a post-capture phase. The frames, e.g. video, may also be transmitted to the computing device 120 across the network 112 for processing. In some implementations, the receipt of the frames, e.g. video, by the computing device 120 may serve to trigger the computing device 120 to process the video regardless of whether a request is sent or received.

In some implementations, sensor data of the capture device may be provided to the computing device, such as from the capture device through network 112. Sensor data may include movement data that represent movement characteristics of the capture device during the shoot time. Movement data may represent physical changes or movement of the capture device and condition changes of the capture device during the shoot time, such as light, pressure, etc. Sensor data may be collected from various sensors in the capture device as described above.

In various implementations, the capture device and the computing device may work individually or jointly to implement the post-capture phase. For example, the computing device may selectively request individual frames from the capture device e.g. based on partial analysis, instead of the full video. A capture device may also process a lower resolution version of a video (e.g. for bandwidth constrained devices) and send instructions with the lower resolution frames to the computing device to generate still image. In some implementations, a capture device may preprocess the video to identify some frames for processing by the computing device, etc.

In some implementations, during the post-capture phase, the processor 122 of the computing device 120 may analyze one or more captured frames (e.g. frames 206, 210, and 214). One or multiple objects may be detected in the frames and one or more objects may be characterized as target subjects of the video (e.g. children, a mountain lion etc.). A selection component 126 may select one or more of the frames of the video from which to create one or more still images. Selection criteria may include identifying the target subject and determining frames that depict at least a portion of the target subject. Selection criteria may also include previous selection information, such as prior selections of still images by the user or the user's social contacts. In some implementations, a user's image album or other storage of images may be accessed to determine user preferences of still images for the selection criteria.

Further to the processing, the frames may be analyzed to determine a significance of the various objects with selection component 126 and the corresponding significance values may be stored in index 128 in memory 124. Objects that are deemed significant may be used to produce one or more still images from the video. Selection criteria may also include quality of a frame, such as portions of the target subject depicted in the frame, background or foreground depicted in the frame, lighting, blurriness, etc. In some implementations, frames that meet a threshold selection criterion may be selected as a still image.

In some implementations, the selection criteria may be dynamically updated based on user behaviors and preferences. For example, if a particular object in one or more video frames, such as a person identified through facial recognition, or a type of object, such as wildlife images, is determined to be popular with a user, frames with the particular object may be selected for the still images. In some implementations, the image capture system may access image libraries of a user to determine object preferences. Objects that are deemed popular for a user may change at times and the selection criteria may also change accordingly.

A creation component 130 of the computing device 120 may edit and/or construct a new still image from selected captured frame or frames e.g. to adjust for imperfections in any given frame. In some implementations, an object depicted in a frame of interest may be found to be blurry and the blurriness may be treated. For example, the object may be also identified in an adjacent frame or other frames in the video sequence. The frames having the object may be shifted in the sequence of frames and overlapped, if needed, so that the identified object in the overlapping frames is aligned. The overlapping of the objects in one or more frames may reduce the blurriness in the frame of interest to generate a higher quality still image.

The creation component may also combine content from two or more frames in additional manners as well. In some instances, at least portions of a frame may be merged with a frame of interest, for example, to add missing portion or portions of the target subject to the frame of interest. Frames may be combined and stitched together to create a fuller depiction of the scene. In some implementations, frames may be analyzed and those frames that that have content that match missing portion of an object in a frame of interest, e.g. target subject, may be stitched together.

The video or continuous series of frames shot by the moving capture device may be in various orientations and angles. For example, some frames may be in landscape, some portrait and some at angles in between. The frames may be joined along vertical borders, horizontal borders, or along unsymmetrical borders. For example, the frames may be stitched in diagonal relationship as a cross pattern of frames or at frame corners. In some implementations, frames or portions of frames of a series of views may rotate between various orientations, e.g. frames in the series may be in portrait views, landscape views and angular views, to form an arch, partial arch or circular depiction of a scene. The frames or partial frames may be reoriented as needed and stitched together, and optionally added with other frames depicting the scene, to form a still image of the scene.

In some implementations, a frame of interest may be rotated, filled in with content from other frames in the video, cropped, smoothed, or edited using other techniques to produce a quality still image. At times, during a post-capture phase for processing, the creation component may change the orientation of the still image.

After processing, the resulting still image or images may be stored, such as in data store 132 of the computing device 120. In some implementations, the still image may be transmitted across network 112 to the capture device 106 for display, additional editing, further transmission to other computing devices, posting on websites, e.g. social media sites, and/or storage.

In some implementations, the frame processing may be performed by the capture device, at one or more remote computing device or jointly by the capture device and one or more computing devices. Further, the frame processing may be performed immediately after capture or may be performed at a later time. For example, processing may be performed at a preset future time, at regular intervals, or as requested by the user of the capture device, other users or devices. The video or series of continuous frames may be stored, backed up, discarded, marked as "automatically captured", etc.

Figure 3A:
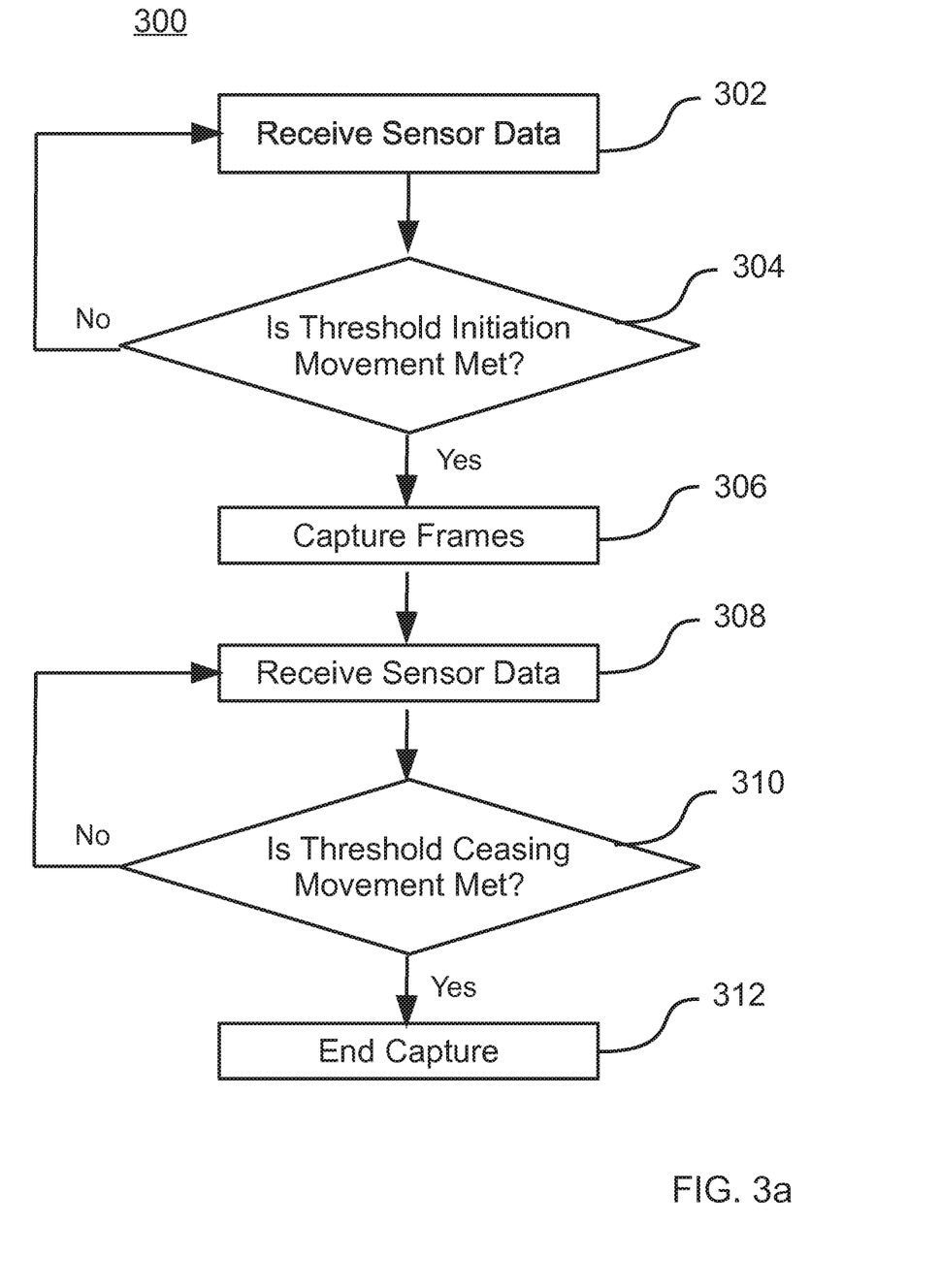
Figure 3B:
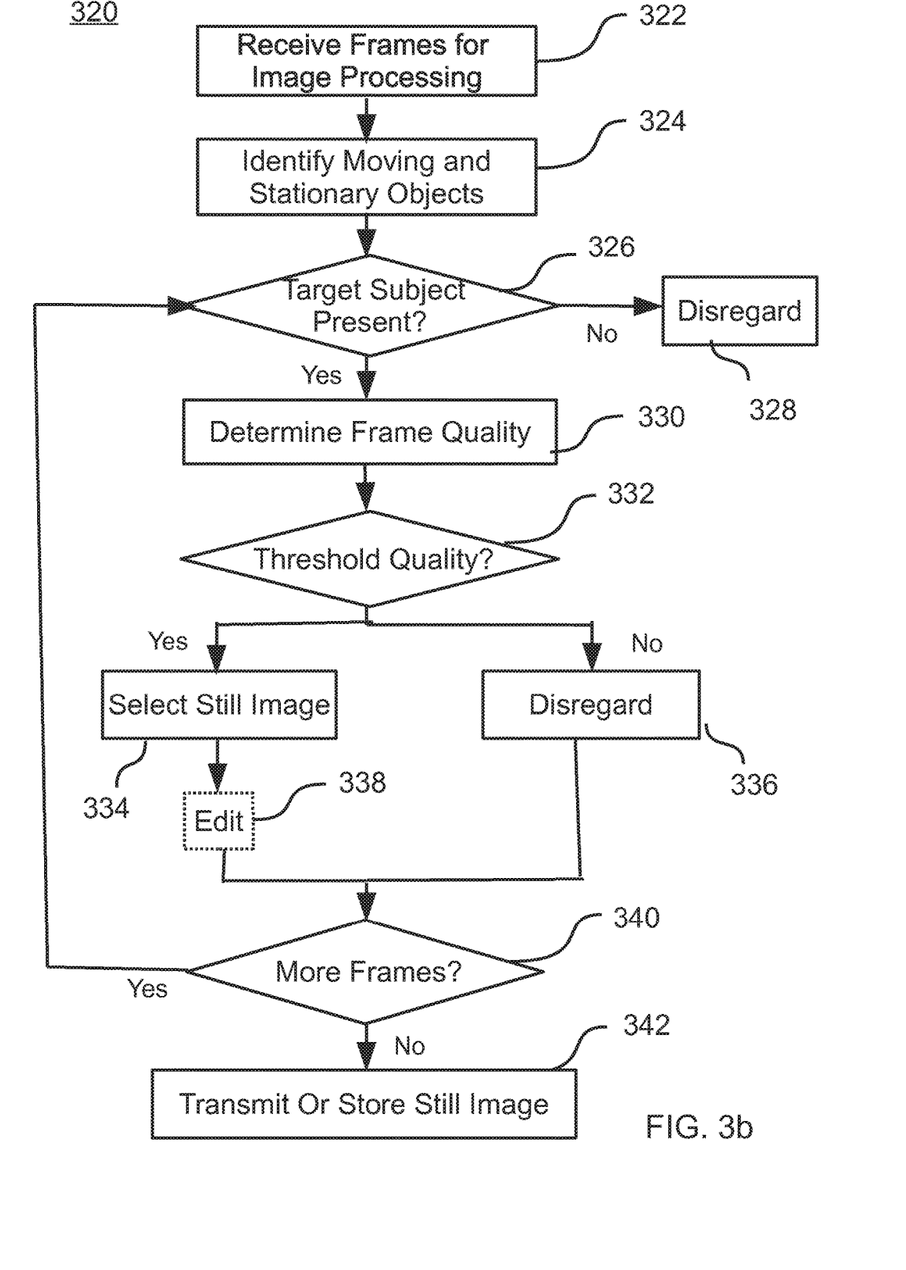

FIGS. 3*a* and 3*b* are flow diagrams of example processes in which FIG. 3*a* shows pre-capture phase 300 and FIG. 3*b* shows post-capture frame processing and producing a still image 320.

The pre-capture process may be performed by a processor in a capture device 106. During the pre-capture phase as described above, one or more sensors collect sensor data. In FIG. 3*a* the sensor data is received 302 from the sensors directly, a sensor data depository, etc. A threshold initiation movement may be identified from the sensor data in decision block 304. If the sensor data does not meet a threshold for an initiation movement, further sensor data may be received in block 302 and monitored for a threshold initiation movement.

In block 306, a threshold initiation movement may trigger capture of frames, e.g. video or a series of continuous frames. In some implementations, during the capture phase, sensor data may be received in block 308 and monitored to determine whether a threshold ceasing movement is determined in block 310. The sensor data received during capture in block 308 may be the same or different sensor data received to trigger capture in block 302. If the sensor data does not meet a threshold for a ceasing movement, further sensor data may be received in block 308 and monitored for a threshold ceasing movement. A threshold ceasing movement may trigger an end to the capture of frames in block 312. The process may optionally move to a post capture phase, as shown for example in FIG. 3*b*.

In the various implementations described herein, the processor 122 of the computing device 120 may perform the steps described, such as through selection component 126 in memory 124 or by a capture device 106. In block 322, a video or series of continuous frames is received, such as from the capture device 106, a component of the capture device 106, or an intermediary device, e.g. a server. The post-capture phase to produce still images may be applied to video or series of continuous frames captured at any rate and with various capture device equipment. Videos captured at high rates, e.g. 60 frames per second (fps) and greater, may especially benefit from the image capture system.

Frames may be accessed and analyzed in various orders or groups. For example, in some implementations all frames may be analyzed sequentially or non-sequentially, a subset of frames may be analyzed or multiple iterations may occur that process different subsets of frames. The number of frames analyzed may vary, depending at least in part, on the rate of capture (frames per second) and length of the video or series of continuous frames. In some implementations hundreds or thousands of frames may be analyzed.

In block 324, moving and stationary objects from the frames may be identified. Various object recognition techniques may be utilized to identify objects represented in the frame. For example, tree and sky segmentation, face detection, facial recognition, a variety of learning techniques such as neural network processes, and other processes or combinations of processes to identify objects may be used. The object recognition processes may be specific for the type of images being processed. For example, nature images may be processed with object recognition techniques that detect objects commonly found in nature. Such recognition techniques may be integral to the image capture system 100. The image capture system 100 may also access recognition algorithms techniques by software or hardware that is external to the image capture system 100.

In some implementations, in order to recognize an object, the image capture system 100 may compare and match the object (e.g., image of the object) to reference images. In some implementations, the image capture system 100 may search reference images in order to identify any one or more reference images that are similar to the object in the image. In some implementations, for a given reference image, image capture system 100 may extract features from the image of the object for analysis, and then compare those features to those of one or more reference images. For example, image capture system 100 may analyze the relative position, size, and/or shape of object features such as facial characteristics, body characteristics, etc. In some implementations, image capture system 100 may use data gathered from the analysis to match the object in the image to one more reference images with matching or similar features. In some implementations, image capture system 100 may normalize multiple reference images, and compress object data from those images into a composite representation having information (e.g., object feature data), and then compare the object in the image to the composite representation for facial recognition. In some implementations, location information in which the video frames where captured and context of surrounding objects may be used in the object recognition. For example, a tennis player may be recognized on a tennis court and children may be recognized near a school or playground.

In some scenarios, the object in the image may be similar to multiple reference images associated with the objects in the same category. As such, there would be a high probability that the object associated with the object in the image is the same type of object associated with the reference images (e.g., a mountain lion).

In some implementations, to facilitate object recognition, image capture system 100 may use geometric recognition techniques, which are based on feature discrimination. The image capture system 100 may also use photometric techniques, which are based on a statistical approach that distills an object feature into values for comparison. A combination of the geometric and photometric approaches could also be used when comparing the object in the image to one or more references.

Other recognition techniques may be used. For example, image capture system 100 may use recognition techniques that use one or more of principal component analyses, linear discriminant analysis, elastic bunch graph matching, hidden Markov models, and dynamic link matching. It will be appreciated that image capture system 100 may use other known or later developed recognition techniques, and/or systems.

In some implementations, image capture system 100 may generate an output indicating a likelihood (or probability) that the object in the image matches a given reference image. In some implementations, the output may be represented as a metric (or numerical value) such as a percentage confidence that the object in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Changes in clusters of pixels, e.g. objects, between sequential frames may be recognized. The process in block 324 may identify objects that vary from frame to frame, e.g. change positions, expressions, etc., and may further categorize groups of objects that appear to change together between frames. Further, there may be discrimination made between object variabilities that are due to the capture device 106 moving during a shoot time (e.g. movement characteristics as represented by movement data), changes due to the object in the scene moving and the capture device 106 also moving, and changes due to the object moving within the scene while the capture device 106 remains stationary.

The movement of the capture device 106 may be detected by sensors, as previously described. For example, one or more accelerometer, gyroscope and/or barometer may provide movement information, such as movement in two dimensions, e.g. x and y directions. In some implementations, a sensor, e.g. an autofocus, may determine depth and calculate distance of object from capture device 106. The distance data may be used to triangulate distance between the capture device 106 and object. Various methods of triangulation may be used. With triangulation, z axis data regarding depth of movement may be determined in addition to movement in x and y directions. In this manner of analyzing one, two or three dimensional movement, the image capture system 100 may calculate change due to movement of the capture device 106. For example, movement data of the capture device may be received and interpreted to determine movement of the capture devices during the capture of the frames.

A baseline may be determined by the amount of change in the frame that would have happened if the object remained still in the scene and changes in positions of an object between frames that were due to movement of the capture device 106. The baseline value of object variability between frames may be compared to the observed object variability between frames to determine the extent an object moves between the frames beyond movement based on camera movement alone. Object movement may be isolated and used to further determine a target subject of the video or series of continuous frames. Frames having the target subject may be identified in decision block 326. In some implementations, frames that have at least a portion of the target subject depicted may be used for further analysis. Frames that have no target subject may be disregarded and not used to select a still image, as shown in block 328.

In block 330, a frame having the target subject may be analyzed further to determine a quality of the frame. In decision block 332, it may be determined whether the frame meets a threshold quality. Threshold quality may include various quality factors such as a significant amount of a target object or an entire target object depicted in the frame. Quality factors may also include an amount of distortion, artifacts, noise, sharpness, contrast, lighting, dynamic range, color accuracy, vignetting, exposure, lateral chromatic aberration, lens flare, color moire, etc. of a frame. Other quality factors may be possible, such as factors based on user preferences.

If the frame quality is found to meet the threshold, the frame may be marked as a still image, as shown in block 334. If the quality is below a threshold, the frame may be disregarded as in block 336. In some implementations, a frame having lower than threshold quality may be edited, e.g. smoothed, to improve the quality of a resulting image, as also shown in block 336.

In some implementations, the selected frame may be optionally edited 338 to reduce blurriness of objects and to compensate for movement of the capture device. The determination of capture device movement in three dimensions, e.g. x, y and/or z directions, may assist in analyzing blurriness and other image defects, such as shadows, dynamic range, focus, etc. that may be due to an object in a scene moving, the capture device 106 moving, or combination thereof. Frames may be inspected to determine the frame or frames that show an onset of the defect, such as blurriness of an object, in the sequence of frames. Frames taken prior to the onset frames, such as the frames immediately prior to the onset frame being defect free with regard to the object defect, may be time shifted so that the prior frame and a defect frame, e.g. blurry frame, are overlapped. The defected object, e.g. blurry object, may be aligned with the defect free object, e.g. in-focus object of the prior defect free frame, to produce a single defect free image, e.g. clear image of the object using the combination of frames.

Other editing schemes may be used on frames to improve image quality, such as mitigating noises, including instances when there are no frames in a video that include a clear depiction of an object. In these cases, discriminating movements due to the capture device 106 and actual object movement in a scene may be used to extrapolate to a desired image of the object, e.g. how the object would look if the object were free of a defect, e.g. in focus. Sequential frames may be analyzed to determine a rate of change of various aspects of a depicted object, such as colors and shapes of the object as shown in some sequential frames. The changes can be averaged to determine how the aspects of the depicted object should appear when defect free, e.g. in focus. Once a defect free appearance, e.g. in focus, is determined, various smoothing techniques, coloring, intensity modification and other editing tools may be applied to generate a still image with a desired depiction, e.g. distinct picture, of an object.

In FIG. 3b, the decision step of block 340 establishes whether there are additional frames analyze in the video. If there are additional frames, the process proceeds to step 306 to identify moving and stationary objects in the next frame. However, if it is determined that there are no additional frames, in some implementations, in block 342, the image capture system 100 may transmit (e.g. to capture device 106) or store (e.g. in data store 132) one or more selected still images.

It should be understood that, for any process discussed herein, there may be additional, fewer or alternative steps performed in similar or alternative orders, or in parallel, within the scope of the various implementations unless otherwise stated. In various implementations, operations that are performed in response to another operation are not performed if the prior operation is unsuccessful. Furthermore, steps described as transmitting data from a device to another device includes placing the data into a network 112 intended for the other device. But the other device may not receive the data. Similarly, steps described as one device receiving data from another device may not include the other device transmitting the data.

Figure 4:
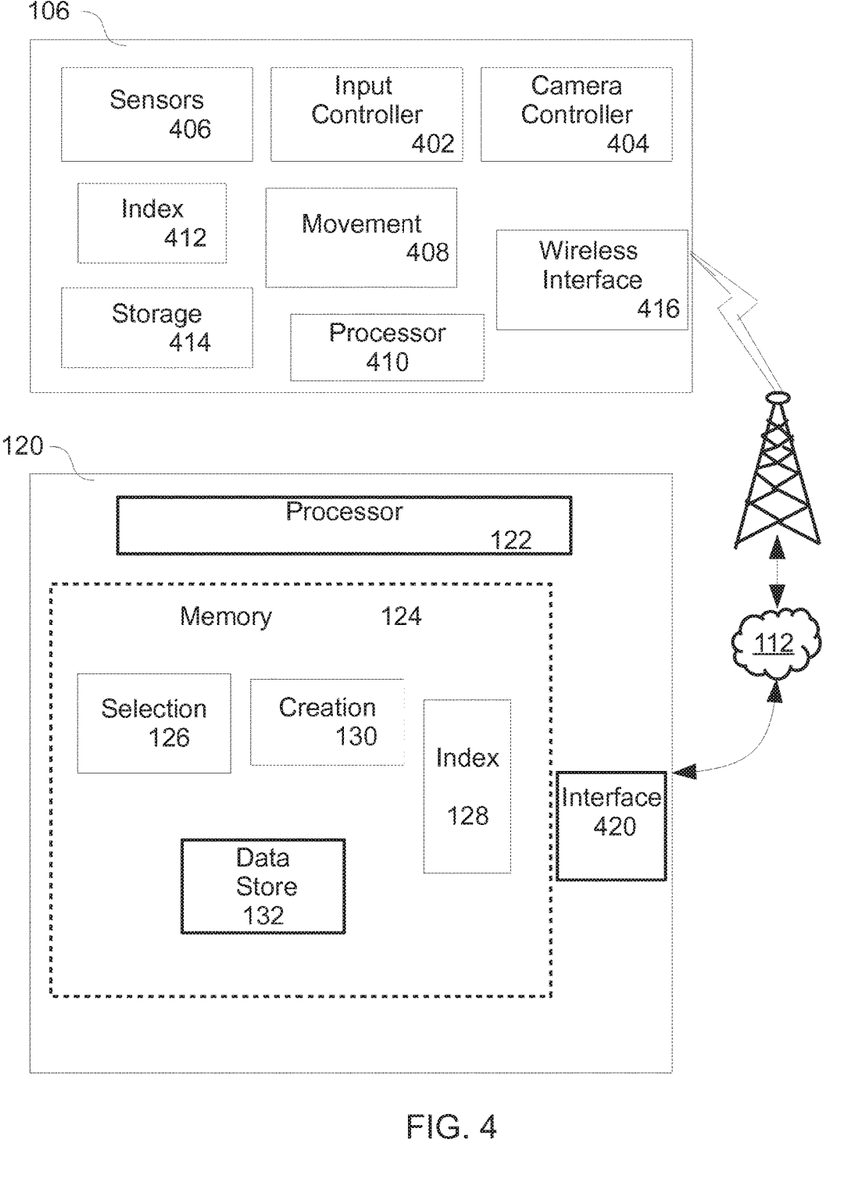
FIG. 4 is a schematic diagram illustrating selected example components of a capture device and computing device of an image capture system that implements a process of producing a still image from a video; all in accordance with the present disclosure.

In FIG. 4, the capture device 106 and the computing device 120 and at least some of their components are shown, according to some implementation of the image capture system.

The capture device 106 may include one or more controllers, such as an input controller 402 to direct the input element and a camera controller 404 to control the capture of images and a processor 410.

One or more sensors 406 may provide data to a movement module 408. The movement module may determine whether a movement characteristic meets a threshold and further may determine whether a combination of movement characteristics from one or more sensors meet a threshold initiation movement that indicates a user's intention to capture an image.

An index 412 may store various data that may be accessed by the movement module 408, such as movement characteristics and prior user behaviors. The prior user behavior data may be referenced in determining various process parameters. For example, prior user actions to initiate or stop capturing images may be user to set or change threshold initiation and ceasing movements. Also, in selecting frames, prior frame selections by a user may be referenced to determine selection criteria. The index may be dynamically updated with changes in criteria, such as thresholds and ranges. The capture device 106 may also include various storage, such as storage 414 in which the edited and original images may be stored.

The capture device 106 may communicate through network 112 from wireless interface 416 to computing device 120 at its interface 420. Interfaces 416 and 420 enable communication with remote devices (e.g., capture devices, servers, other computing devices) over one or more networks 112. Interfaces 416 and 420 can include an Ethernet adapter, USB (universal serial bus), wireless interconnection components, or other wired or wireless standards-based or proprietary interfaces.

The computing device 120 may include one or more processors 122 and memory 124. The processor 122 may process instruction for execution within the computing device 120 including instructions stored in memory 124 or on the data store 132. The processor may coordinate computing device components, e.g. applications, wireless or wired communication through interfaces, etc. In some implementations, multiple processors and buses may be used.

The processors 410, 122 may be implemented as a chipset of chips that include separate and multiple analog digital processors. The processor may also be implemented using various architectures. For example, the processor 410, 122 may be a CISC (Complex Instruction Set Computer) processor, RISC (Reduced Instruction Set Computer) processor or MISC (Minimal Instruction Set Computer) processor.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems.

The memory 124 stores information within the computing device 120. The memory 124 may be any suitable data storage, memory and/or non-transitory computer-readable storage media, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

The one or more processors 122 and the memory 124 may implement a selection component 126, a creation component 130, and data store 132. The computing device 120 may also include an index 128 storing data useful for analyzing and selecting frames with selection component 126 and producing still images with creation component 130. The data in index 128 may include prior user behavior data, social contact behavior, preferences input by the user, and other data for capture and/or selection of images. For example, particular favorite target subjects or quality thresholds for frames may be classified in the index based on user's prior selection of frames, web postings, user input of preferences etc. The index data may further include image libraries of a user or group of users and the images may be assessed to determine preferences.

Data store 132 and storage 414 may keep applications and other data. Data store may also be employed to store the original image as well as various edited versions of the image. At least a portion of the information may also be stored on a disk drive or other computer readable storage device (not shown) within the computing device 120 and capture device 106. Such storage device include a floppy disk device, a hard disk device, an optical disk device, or a tape device, a flash memory or other similar solid state memory device, or an array of devices.

A computer program, also referred to as programs, software, software applications or code, may also contain instructions that, when executed, perform one or more methods, such as those described herein. The computer program may be tangibly embodied in an information carrier such as computer or machine readable medium, for example, the memory 124, storage device or memory on processor 122. A machine readable medium is any computer program product, apparatus or device used to provide machine instructions or data to a programmable processor.

The computing device 120 may be implemented in a number of different forms. In some implementations, the computing device 120 may be substituted with one or more networked servers, such as servers in a cloud computing network. In some implementations, it may be implemented in a personal computer such as a laptop computer.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A number of implementations have been described. Features described with conditional language may describe implementations that are optional. The functional blocks, methods, devices, and systems described in the present disclosure may be integrated or divided into different combinations of systems, devices, and functional blocks as would be known to those skilled in the art. Although the description has been described with respect to particular implementations thereof, these particular implementations are merely illustrative, and not restrictive. Concepts illustrated in the examples may be applied to other examples and implementations. Thus, various modifications may be made without departing from the spirit and scope of this disclosure and other implementations are within the scope of the following claims.

What is claimed is:

1. A computer-implemented method comprising:
    detecting a change in two or more initiation movement characteristics of a capture device, wherein the two or more initiation movement characteristics include at least one of: a change in temperature and an increase in ambient light;
    determining a combination of at least two of the two or more initiation movement characteristics meets an initiation threshold indicating preparation to acquire images of a subject by the capture device;
    activating automatic capture of a plurality of images by the capture device in response to determining the combination meets an initiation threshold; and
    selecting at least one image of the plurality of images depicting at least a portion of the subject.

2. The method of claim 1, wherein detecting the change in the two or more initiation movement characteristics occurs as the capture device moves from a first environment to a second environment.

3. The method of claim 2, wherein the first environment includes a receptacle and the capture device moves from the receptacle to the second environment.

4. The method of claim 2, wherein the change of temperature includes a decrease in ambient temperature in the second environment from ambient temperature in the first environment.

5. The method of claim 2, further including:
    after activating automatic capture, detecting one or more completion movement characteristics of the capture device as the capture device moves from the second environment to the first environment;
    determining at least one of the one or more completion movement characteristics meet a completion threshold indicating conclusion of acquiring images of the subject; and
    stopping the automatic capture of the plurality of images by the capture device in response to determining the at least one of the one or more completion movement characteristics meet the completion threshold.

6. The method of claim 2, wherein the two or more initiation movement characteristics further include detection of at least one particular subject in the second environment.

7. The method of claim 1, wherein the two or more initiation movement characteristics are detected by at least one sensor of the capture device.

8. A non-transitory computer-readable medium storing instructions that, when executed by one or more processors, cause the one or more processors to perform operations comprising:
    detecting a change in two or more initiation movement characteristics of a capture device, wherein the two or more initiation movement characteristics include at least one of: a change in temperature and an increase in ambient light;
    determining a combination of at least two of the two or more initiation movement characteristics meets an initiation threshold indicating preparation to acquire images of a subject by the capture device;
    activating automatic capture of a plurality of images by the capture device in response to determining the combination meets an initiation threshold; and
    selecting at least one image of the plurality of images depicting at least a portion of the subject.

9. The computer-readable medium of claim 8, wherein detecting the change in the two or more initiation movement characteristics occurs as the capture device moves from a first environment to a second environment.

10. The computer-readable medium of claim 9, wherein the first environment includes a receptacle and the capture device moves from the receptacle to the second environment.

11. The computer-readable medium of claim 9, wherein the change of temperature includes a decrease in ambient temperature in the second environment from ambient temperature in the first environment.

12. The computer-readable medium of claim 9, wherein the operations further comprise:
after activating automatic capture, detecting one or more completion movement characteristics of the capture device as the capture device moves from the second environment to the first environment;
determining at least one of the one or more completion movement characteristics meet a completion threshold indicating conclusion of acquiring images of the subject; and
stopping the automatic capture of the plurality of images by the capture device in response to determining the at least one of the one or more completion movement characteristics meet the completion threshold.

13. The computer-readable medium of claim 9, wherein the two or more initiation movement characteristics further include detection of at least one particular subject in the second environment.

14. The computer-readable medium of claim 8, wherein the two or more initiation movement characteristics are detected by at least one sensor of the capture device.

15. A system comprising:
one or more hardware processors; and
one or more computer-readable media having instructions stored thereon that, when executed by the one or more hardware processors, cause performance of operations comprising:
detecting a change in two or more initiation movement characteristics of a capture device, wherein the two or more initiation movement characteristics include at least one of: a change in temperature and an increase in ambient light;
determining a combination of at least two of the two or more initiation movement characteristics meets an initiation threshold indicating preparation to acquire images of a subject by the capture device;
activating automatic capture of a plurality of images by the capture device in response to determining the combination meets an initiation threshold; and
selecting at least one image of the plurality of images depicting at least a portion of the subject.

16. The system of claim 15, wherein detecting the change in the two or more initiation movement characteristics occurs as the capture device moves from a first environment to a second environment.

17. The system of claim 16, wherein the first environment includes a receptacle and the capture device moves from the receptacle to the second environment.

18. The system of claim 16, wherein the change of temperature includes a decrease in ambient temperature in the second environment from ambient temperature in the first environment.

19. The system of claim 16, wherein the operations further comprise:
after activating automatic capture, detecting one or more completion movement characteristics of the capture device as the capture device moves from the second environment to the first environment;
determining at least one of the one or more completion movement characteristics meet a completion threshold indicating conclusion of acquiring images of the subject; and
stopping the automatic capture of the plurality of images by the capture device in response to determining the at least one of the one or more completion movement characteristics meet the completion threshold.

20. The system of claim 16, wherein the two or more initiation movement characteristics further include detection of at least one particular subject in the second environment.

* * * * *